US012812066B2

(12) United States Patent
Wang et al.

(10) Patent No.: US 12,812,066 B2
(45) Date of Patent: Nov. 24, 2026

(54) METHOD AND SYSTEM FOR FUSING A PLURALITY OF SIGNALS, DEVICE, STORAGE MEDIUM, AND COMPUTER PROGRAM PRODUCT

(71) Applicant: Amlogic (Shanghai) Co., Ltd., Shanghai (CN)

(72) Inventors: Dongjian Wang, Shanghai (CN); Xuyun Chen, Shanghai (CN)

(73) Assignee: Amlogic (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 19/222,092

(22) Filed: May 29, 2025

(65) Prior Publication Data

US 2025/0373753 A1 Dec. 4, 2025

(30) Foreign Application Priority Data

May 30, 2024 (CN) ......................... 202410694827.0

(51) Int. Cl.
*H04N 7/01* (2006.01)
*H04N 5/265* (2006.01)
*H04N 13/183* (2018.01)

(52) U.S. Cl.
CPC ............... *H04N 7/01* (2013.01); *H04N 5/265* (2013.01)

(58) Field of Classification Search
CPC H04N 7/01; H04N 5/265; H04N 5/05; H04N 5/44504; H04N 5/45; H04N 5/445; H04N 13/183
See application file for complete search history.

(56) References Cited

U.S. PATENT DOCUMENTS 5,287,189 A * 2/1994 Ersoz ....................... H04N 5/45 348/588
6,078,328 A * 6/2000 Schumann ........... G11B 27/034 375/E7.181

(Continued)

FOREIGN PATENT DOCUMENTS

CN 114745520 A 7/2022
EP 3381179 B1 4/2024

OTHER PUBLICATIONS

Extended European Search Report issued in European Patent Application No. 25179420.2, dated Oct. 10, 2025, in 8 pages.

(Continued)

*Primary Examiner* — Brian P Yenke
(74) *Attorney, Agent, or Firm* — Knobbe, Martens, Olson & Bear, LLP

(57) ABSTRACT

A method and system for fusing a plurality of signals, a device, a storage medium, and a computer program product are provided. The method includes: obtaining a picture signal of a target frame in a video of a main path as a main picture signal; obtaining a picture signal of a secondary path as a secondary picture signal; performing display standard conversion on the secondary picture signal, and aligning a display standard of the secondary picture signal with a display standard of the main picture signal; and fusing the main picture signal and the secondary picture signal to obtain a target picture signal after performing the display standard conversion on the secondary picture signal. This helps to implement signal fusion with picture quality (PQ) assurance.

18 Claims, 2 Drawing Sheets

(56) References Cited

U.S. PATENT DOCUMENTS

| | | | | |
|---|---|---|---|---|
| 7,206,025 | B2 * | 4/2007 | Choi | H04N 9/641 348/554 |
| 7,365,757 | B1 * | 4/2008 | Callway | G09G 5/397 348/584 |
| 10,643,298 | B2 * | 5/2020 | Chang | G09G 3/2096 |
| 2006/0056716 | A1 * | 3/2006 | Komeno | H04N 21/4621 382/233 |
| 2006/0056810 | A1 * | 3/2006 | Kelly | H04N 21/426 386/230 |
| 2008/0005767 | A1 * | 1/2008 | Seo | H04N 21/64315 725/62 |
| 2009/0135916 | A1 * | 5/2009 | Lee | H04N 5/44504 375/E7.19 |
| 2010/0085485 | A1 * | 4/2010 | Kim | H04N 9/641 348/739 |
| 2011/0299546 | A1 * | 12/2011 | Prodan | H04N 21/454 370/401 |
| 2012/0306905 | A1 * | 12/2012 | Kim | G09G 5/02 345/589 |
| 2015/0147046 | A1 * | 5/2015 | Van Broeck | G06T 19/20 386/278 |
| 2015/0382083 | A1 * | 12/2015 | Chen | H04N 21/8549 386/281 |
| 2016/0080716 | A1 | 3/2016 | Atkins et al. | |
| 2018/0063404 | A1 | 3/2018 | Chen et al. | |
| 2019/0073746 | A1 * | 3/2019 | Greene | H04N 5/14 |
| 2019/0253742 | A1 * | 8/2019 | Garten | H04N 21/251 |
| 2021/0152799 | A1 * | 5/2021 | Park | G06T 5/92 |
| 2022/0224975 | A1 | 7/2022 | Nishi et al. | |
| 2023/0209012 | A1 * | 6/2023 | Feingold | H04N 7/08 348/207.1 |

OTHER PUBLICATIONS

Office Action dated Jun. 27, 2026 in Chinese Application No. 202410694827.0, 24 pages.

* cited by examiner

METHOD AND SYSTEM FOR FUSING A PLURALITY OF SIGNALS, DEVICE, STORAGE MEDIUM, AND COMPUTER PROGRAM PRODUCT

CROSS-REFERENCE TO RELATED APPLICATIONS

This application claims priority to Chinese Patent Application No. 202410694827.0, filed on May 30, 2024, which is incorporated by reference in its entirety.

TECHNICAL FIELD

Embodiments of the present invention relate to the field of picture processing technologies, and in particular, to a method and system for fusing a plurality of signals, a device, a storage medium, and a computer program product.

BACKGROUND

The video technology has ever-growing requirements for a dynamic range and a color representation space (Gamut) of pictures during evolution from supporting standard definition (SD) to high definition (HD), ultra high definition (UHD), and even 8K. Therefore, a series of standards from SDR to HDR (for example, HDR10, HDR10+, HLG, HLG+, Dolby Vision HDR, and Prime) have emerged.

During generation and transmission of signal sources, a requirement is imposed for fusion of signals in videos or graphics (for example, OSD) from multiple paths. When a plurality of signals are all SDR signals in an early stage, as long as data from multiple paths is converted to the same color gamut space (such as RGB or YUV) and then fusion is performed based on a fusion coefficient (Alpha), a fused video may be obtained for subsequent processing or processing by a display component.

However, with an increasing demand for the HDR, especially that of scenarios in which different standards of the HDR are applied in different fields, data fusion related to videos and graphics from multiple paths has become complicated. For example, among them, some are SDR videos, some are HDR videos, and some are even HDR10+ videos with dynamic meta data. Therefore, frame-level meta data alignment needs to be performed, and devices such as content producers and set top boxes need to perform more complicated and targeted processing to complete the data fusion.

SUMMARY

A problem resolved by embodiments of the present invention is to provide a method and system for fusing a plurality of signals, a device, a storage medium, and a computer program product, which helps implement signal fusion with picture quality (PQ) assurance.

To resolve the above problem, an embodiment of the present invention provides a method for fusing a plurality of signals, including: obtaining a picture signal of a target frame in a video of a main path as a main picture signal; obtaining a picture signal of a secondary path as a secondary picture signal; performing display standard conversion on the secondary picture signal, and aligning a display standard of the secondary picture signal with a display standard of the main picture signal; and fusing the main picture signal and the secondary picture signal to obtain a target picture signal after performing the display standard conversion on the secondary picture signal.

Optionally, when the secondary path is a video path, a picture signal of a corresponding frame in a video of the secondary path is obtained as the secondary picture signal in the step of obtaining the picture signal of the secondary path as the secondary picture signal; Alternatively, when the secondary path is a graphic path, a graphic signal of the secondary path is obtained as the secondary picture signal in the step of obtaining the picture signal of the secondary path as the secondary picture signal.

Optionally, the display standard of the secondary picture signal is lower than the display standard of the main picture signal.

Optionally, before the performing display standard conversion on the secondary picture signal, and aligning a display standard of the secondary picture signal with a display standard of the main picture signal, the method further includes: obtaining meta data of the main picture signal; and the step of aligning the display standard of the secondary picture signal with the display standard of the main picture signal includes: parsing the meta data of the main picture signal to obtain the display standard of the main picture signal, and using the display standard of the main picture signal as a target display standard; and performing the display standard conversion on the secondary picture signal based on the target display standard.

Optionally, the step of performing the display standard conversion on the secondary picture signal based on the target display standard includes: converting the secondary picture signal into a data processing signal; converting the data processing signal into an alignment signal of the target display standard; converting the alignment signal into a display signal; and fusing the display signal and the main picture signal to obtain the target picture signal in the step of fusing the main picture signal and the secondary picture signal.

Optionally, the step of parsing the meta data of the main picture signal to obtain the display standard of the main picture signal as the target display standard includes: obtaining a color gamut of the main picture signal as a target color gamut; obtaining a luminance domain of the main picture signal as a target luminance domain; and the step of converting the data processing signal into the alignment signal of the target display standard includes: converting the data processing signal from a source color gamut to the target color gamut, and converting the data processing signal from the source luminance domain to the target luminance domain, to obtain an alignment signal in the target color gamut and target luminance domain.

Optionally, the data processing signal is converted from the source color gamut to the target color gamut through a color gamut matrix or a three-dimensional mapping table.

Optionally, the data processing signal is converted from the source luminance domain to the target luminance domain through a luminance look up table (LUT).

Optionally, the step of converting the secondary picture signal into the data processing signal includes: realizing conversion of the secondary picture signal from a nonlinear domain to a linear domain, to obtain a linear signal of the secondary picture signal mapped to the linear domain as the data processing signal.

Optionally, the conversion of the secondary picture signal from the nonlinear domain to the linear domain is realized through a linear LUT.

Optionally, the step of converting the alignment signal into the display signal includes: realizing conversion of the alignment signal from a linear domain to a nonlinear domain to obtain a nonlinear signal of the alignment signal mapped to the nonlinear domain as the display signal.

Optionally, the conversion of the alignment signal from the linear domain to the nonlinear domain is realized through a nonlinear LUT.

Optionally, in the step of obtaining the picture signal of the target frame in the video of the main path as the main picture signal, a color space corresponding to the main picture signal is obtained as a target color space; and before the fusing the display signal and the main picture signal, the method includes: performing color space conversion to map the display signal to the target color space; and fusing the display signal after the color space conversion with the main picture signal in the step of fusing the display signal and the main picture signal.

Optionally, after the fusing the main picture signal and the secondary picture signal to obtain the target picture signal, the method further includes: configuring the meta data of the main picture signal into a target graphic signal.

Optionally, before the fusing the main picture signal and the secondary picture signal to obtain the target picture signal, the method further includes: obtaining a fusion coefficient, where the fusion coefficient characterizes a relative weight of the main picture signal and the secondary picture signal during fusion; and the step of obtaining the target picture signal includes: obtaining, based on the fusion coefficient, a weight value of each of the main picture signal and the secondary picture signal; and performing weighted average processing on the main picture signal and the secondary picture signal based on the weight values, to obtain the target picture signal.

Correspondingly, an embodiment of the present invention further provides a system for fusing a plurality of signals, including: a main path signal obtaining component, configured to obtain a picture signal of a target frame in a video of a main path as a main picture signal; a secondary path signal obtaining component, configured to obtain a picture signal of a secondary path as a secondary picture signal; a display standard alignment component, configured to perform display standard conversion on the secondary picture signal, and align a display standard of the secondary picture signal with a display standard of the main picture signal; and a target signal obtaining component, configured to fuse the main picture signal and the secondary picture signal to obtain a target picture signal after performing the display standard conversion on the secondary picture signal.

Correspondingly, an embodiment of the present invention further provides a device, including at least one memory and at least one processor, the memory storing one or more computer instructions, the one or more computer instructions being executed by the processor to implement the method for fusing a plurality of signals provided in the embodiments of the present invention.

Correspondingly, an embodiment of the present invention further provides a storage medium, the storage medium storing one or more computer instructions, the one or more computer instructions being configured for implementing the method for fusing a plurality of signals provided in the embodiments of the present invention.

Correspondingly, an embodiment of the present invention further provides a computer program product, including a computer program/instruction, the computer program/instruction, when executed by a processor, implementing the method for fusing a plurality of signals provided in the embodiments of the present invention.

Compared with the prior art, the technical solutions of the embodiments of the present invention have the following advantages.

According to the method for fusing a plurality of signals provided in the embodiments of the present invention, display standard conversion is performed on the secondary picture signal, and the display standard of the secondary picture signal is aligned with the display standard of the main picture signal. After the display standard conversion is performed on the secondary picture signal, the main picture signal and the secondary picture signal are fused to obtain a target picture signal. In the embodiments of the present invention, the display standard of the secondary picture signal is aligned with the display standard of the main picture signal, that is, the secondary picture signal of the secondary path is aligned with the main picture signal of the main path by using the display standard of the main picture signal of the main path as a reference. Moreover, the display standard of the main path, especially a video, is usually higher than the display standard of the secondary path, and then the main picture signal and the secondary picture signal are fused to obtain the target picture signal, which helps ensure PQ of a region of a secondary picture signal in the target picture signal, and reduce a probability of inter-frame flicker in a region of the secondary picture signal, and further helps maintain the PQ of the main path video and well maintain the PQ of the target picture signal after fusion, thereby implementing signal fusion with PQ assurance.

DETAILED DESCRIPTION

It may be learned from the background art it is difficult to desirably achieve fusion of a plurality of signals at present. The reasons why it is difficult to desirably achieve fusion of a plurality of signals at present are analyzed below according to a method for fusing a plurality of signals.

Figure 1:
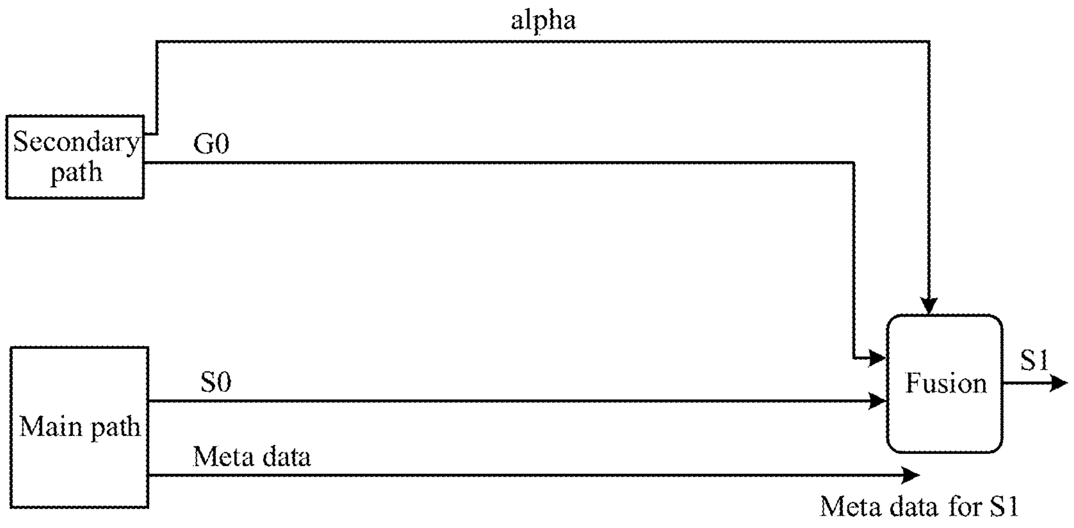
FIG. 1 is a schematic diagram of corresponding steps of a method for fusing a plurality of signals.

FIG. 1 is a schematic diagram of corresponding steps of a method for fusing a plurality of signals.

Referring to FIG. 1, a main picture signal S0 of a main path is provided, a secondary picture signal G0 of a secondary path is provided, the main picture signal S0 and the secondary picture signal G0 are fused with alpha as a fusion coefficient to obtain a target picture signal S1, and meta data of the main picture signal S0 is transmitted to a next stage as meta data of the target picture signal S1 after the fusion.

The display standard of the main picture signal S0 is usually higher than the display standard of the secondary picture signal G0. If the main picture signal S0 and the secondary picture signal G0 are simply fused, it is difficult to guarantee picture quality (PQ) of the secondary picture signal G0. Especially for the main picture signal G0 with meta data that changes by frame, incorrect parsing of the secondary picture signal G0 easily leads to a problem of inter-frame flicker in a region of the secondary picture signal G0 in the target picture signal S1.

In another embodiment, the display standard of the main picture signal S0 may further be aligned with the display standard of the secondary picture signal G0 for fusion, which easily leads to a downgrade in the quality of the main picture signal S0 and further leads to the inability to transmit the meta data of the target picture signal S1 through the main picture signal S0, making it difficult to maintain dynamic meta data.

In some other embodiments, the display standards of the main picture signal S0 and the secondary picture signal G0 are further aligned with the display standard of the display device for fusion, which still easily leads to a downgrade in the quality of the main picture signal S0 and further leads to the inability to transmit the meta data of the target picture signal S1 through the main picture signal S0, making it difficult to maintain dynamic meta data.

Therefore, it is difficult to desirably achieve fusion of a plurality of signals at present.

Figure 2:
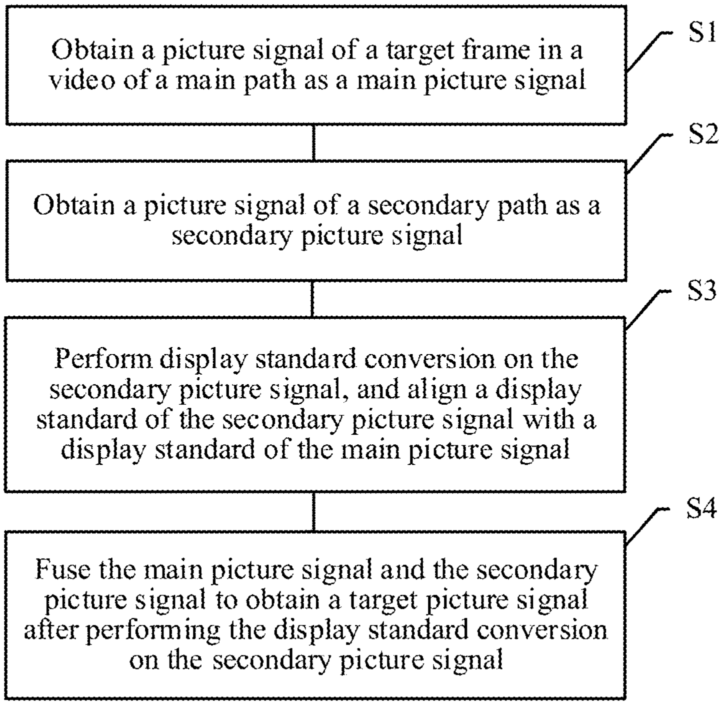
FIG. 2 is a flowchart of an embodiment of a method for fusing a plurality of signals.

To resolve the above technical problem, an embodiment of the present invention provides a method for fusing a plurality of signals. Referring to FIG. 2, a flowchart of an embodiment of a method for fusing a plurality of signals is shown.

In this embodiment, the method for fusing a plurality of signals includes the following basic steps.

Step S1: Obtain a picture signal of a target frame in a video of a main path as a main picture signal.

Step S2: Obtain a picture signal of a secondary path as a secondary picture signal.

Step S3: Perform display standard conversion on the secondary picture signal, and align a display standard of the secondary picture signal with a display standard of the main picture signal.

Step S4: Fuse the main picture signal and the secondary picture signal to obtain a target picture signal after performing the display standard conversion on the secondary picture signal.

In the embodiments of the present invention, the display standard of the secondary picture signal is aligned with the display standard of the main picture signal, that is, the secondary picture signal of the secondary path is aligned with the main picture signal of the main path by using the display standard of the main picture signal of the main path as a reference. Moreover, the display standard of the main path, especially a video, is usually higher than the display standard of the secondary path, and then the main picture signal and the secondary picture signal are fused to obtain the target picture signal, which helps ensure PQ of a region of a secondary picture signal in the target picture signal, and reduce a probability of inter-frame flicker in a region of the secondary picture signal, and further helps maintain the PQ of the main path video and well maintain the PQ of the target picture signal after fusion, thereby implementing signal fusion with PQ assurance.

In order to make the foregoing objectives, features, and advantages of the embodiments of the present invention more apparent and easier to understand, specific embodiments of the present invention are described in detail below with reference to the accompanying drawings.

Figure 3:
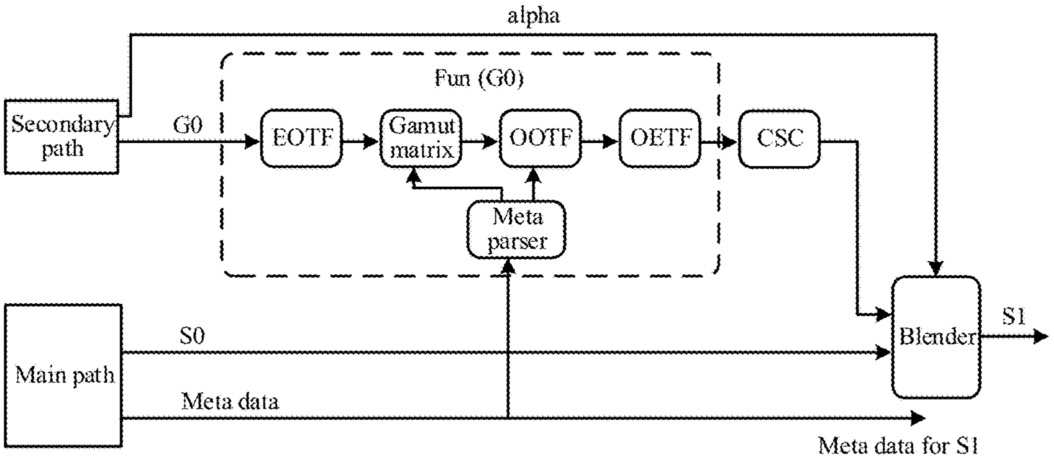
FIG. 3 is a schematic diagram of corresponding steps in an embodiment of a method for fusing a plurality of signals.

FIG. 3 is a schematic diagram of corresponding steps in an embodiment of a method for fusing a plurality of signals.

Referring to FIG. 3, step S1 of obtaining a picture signal of a target frame in a video of a main path as a main picture signal S0 is performed.

The main path is a main video path, and a target frame in a main video is a picture that needs to be fused in the main video. A picture signal of the target frame in the video of the main path is obtained as the main picture signal S0, which is used as a reference for subsequent fusion.

Specifically, in this embodiment, the main path is a high efficiency video coding decoder (HEVC decoder), and the main picture signal S0 is obtained from the HEVC decoder. In another embodiment, the main picture signal may further be obtained from a decoder in another format (for example, AVS or AV1).

A display standard of the main video is usually relatively high. In an example, in this embodiment, the display standard of the main picture signal S0 of the video of the main path is high dynamic range plus (HDR10+).

In this embodiment, in the step of obtaining the picture signal of the target frame in the video of the main path as the main picture signal S0, a color space corresponding to the main picture signal S0 is obtained as a target color space. The target color space is a color space to which mapping is required for subsequent fusion of the plurality of signals.

Specifically, in this embodiment, the obtained target color space that is the color space corresponding to the main picture signal S0 is a YUV color space, and the obtained main picture signal S0 that is the picture signal of the target frame in the video of the main path is a YUV signal. The YUV signal means that the main picture signal S0 is a signal mapped to the YUV color space, where the YUV signal is a combination of a luminance signal (Y) and two color difference signals (a U component and a V component).

Step S2 of obtaining a picture signal of a secondary path as a secondary picture signal G0 is performed.

The secondary picture signal G0 of the secondary path is configured for achieving subsequent signal fusion with the main picture signal S0.

A display standard of a picture of the secondary path is usually relatively low. In an example, in this embodiment, a display standard of the secondary picture signal G0 of the secondary path is standard dynamic range (SDR).

In an example, in this embodiment, the secondary picture signal G0 is an RGB signal. The RGB signal refers to a signal of the secondary picture signal G0 in an RGB color space, where RGB represents colors of red, green, and blue paths.

Correspondingly, in this embodiment, in the step of obtaining the picture signal of the secondary path as the secondary picture signal G0, the display standard of the secondary picture signal G0 is lower than the display standard of the main picture signal S0.

In this embodiment, in the step of obtaining the picture signal of the secondary path as the secondary picture signal G0, the secondary path is a graphic path (graphic layer).

In an example, in this embodiment, the secondary path is a graphics processing unit (GPU), and the secondary picture signal G0 is obtained from an on-screen display layer (OSD layer) of the GPU.

In this embodiment, when the secondary path is a video path, in the step of obtaining the picture signal of the secondary path as the secondary picture signal G0, a graphic signal of the secondary path is obtained as the secondary picture signal G0.

In an example, in this embodiment, the obtained secondary picture signal G0 that is the graphic signal of the secondary path is a menu graphic.

In another embodiment, in the step of obtaining the picture signal of the secondary path as the secondary picture signal, the secondary path is a video path.

A video of the secondary path is a secondary video.

In another embodiment, when the secondary path is a video path, a picture signal of a corresponding frame in a video of the secondary path is obtained as the secondary picture signal in the step of obtaining the picture signal of the secondary path as the secondary picture signal.

In this embodiment, before the performing display standard conversion on the secondary picture signal G0, and aligning a display standard of the secondary picture signal G0 with a display standard of the main picture signal S0 subsequently, the method further includes: obtaining meta data of the main picture signal S0.

Meta data is data about data, which is mainly defined as information about data properties. The obtained meta data of the main picture signal S0 is configured for subsequently obtaining, based on the meta data of the main picture signal S0, a reference for aligning the display standard of the secondary picture signal G0 with the display standard of the main picture signal S0.

Specifically, in this embodiment, the main video of the main path is an HDR10+ video with corresponding frame-level meta data. In other words, the main picture signal S0 has frame-based dynamic meta data.

Step S3 of performing display standard conversion on the secondary picture signal G0, and aligning a display standard of the secondary picture signal G0 with a display standard of the main picture signal S0 is performed.

The alignment means that the display standard of the secondary picture signal G0 is converted to be the same as the display standard of the main picture signal S0.

The display standard conversion is performed on the secondary picture signal G0, and the display standard of the secondary picture signal G0 is aligned with the display standard of the main picture signal S0, so that the secondary picture signal G0 and the main picture signal S0 can perform data fusion in the same space subsequently.

In this embodiment, the display standard of the secondary picture signal G0 is aligned with the display standard of the main picture signal S0, that is, the secondary picture signal G0 of the secondary path is aligned with the main picture signal S0 of the main path by using the display standard of the main picture signal S0 of the main path as a reference. Moreover, the display standard of the main path, especially a video, is usually higher than the display standard of the secondary path, and then the main picture signal S0 and the secondary picture signal G0 are fused to obtain the target picture signal, which helps ensure PQ of a region of a secondary picture signal G0 in the target picture signal, and reduce a probability of inter-frame flicker in the region of the secondary picture signal G0, and further helps maintain the PQ of the main path video and well maintain the PQ of the target picture signal after fusion, thereby implementing signal fusion with PQ assurance.

In an example, referring to FIG. 3, in this embodiment, Fun (D0) is adopted to perform the display standard conversion on the secondary picture signal G0.

In this embodiment, the step of performing display standard conversion on the secondary picture signal G0, and aligning a display standard of the secondary picture signal with a display standard of the main picture signal includes: parsing the meta data of the main picture signal S0 to obtain the display standard of the main picture signal S0, and using the display standard of the main picture signal S0 as a target display standard.

The meta data of the main picture signal S0 is parsed to obtain the display standard of the main picture signal S0 as the target display standard, which is used as a reference to perform display standard conversion on the secondary picture signal G0.

In an example, referring to FIG. 3, the meta data of the main picture signal S0 is parsed through a meta parser, to obtain the display standard of the main picture signal S0 as the target display standard.

In this embodiment, the parsing the meta data of the main picture signal S0 to obtain the display standard of the main picture signal S0 as the target display standard includes: obtaining a color gamut of the main picture signal S0 as a target color gamut; and obtaining a luminance domain of the main picture signal S0 as a target luminance domain.

The color gamut of the main picture signal S0 is obtained as the target color gamut, so that the secondary picture signal G0 subsequently obtains, based on this, a signal matching the target color gamut after the conversion. The luminance domain of the main picture signal S0 is obtained as the target luminance domain, so that the secondary picture signal G0 subsequently obtains, based on this, a signal matching the target luminance domain after the conversion.

Correspondingly, in this embodiment, the display standard conversion is performed on the secondary picture signal G0 based on the target display standard.

In this embodiment, the step of performing the display standard conversion on the secondary picture signal G0 based on the target display standard includes: converting the secondary picture signal G0 into a data processing signal.

The secondary picture signal G0 is converted into a data processing signal, so that the secondary picture signal G0 is converted into a signal suitable for measurement, and the subsequent conversion of the display standard of the data processing signal is more accurate.

In this embodiment, the step of converting the secondary picture signal G0 into the data processing signal includes: realizing conversion of the secondary picture signal G0 from a nonlinear domain to a linear domain, to obtain a linear signal of the secondary picture signal G0 mapped to the linear domain as the data processing signal.

The conversion of the secondary picture signal G0 from the nonlinear domain (Electrical Domain) to the linear domain (Linear/Optical Domain) is realized to obtain a linear signal that is easier to measure, which helps improve the accuracy of subsequent display standard conversion of the linear signal.

In an example, referring to FIG. 3, the secondary picture signal G0 is converted into a linear signal through an electro-optical transfer function (EOTF).

In this embodiment, the conversion of the secondary picture signal G0 from the nonlinear domain to the linear domain is realized through a linear look up table (LUT).

Specifically, an RGB signal of a pixel is inputted into a linear LUT, and a corresponding address is obtained from the linear LUT. The address displays a new RGB signal in the linear LUT, and the original RGB signal is replaced with the new RGB signal to obtain the linear signal.

It should be noted that in this embodiment, based on cost considerations in practical implementation, a table size of the LUT is usually less than (2^n), where n is a number of bits of RGB components of pixels, having a median value determined through a linear or Cubic interpolation of adjacent LUT nodes. The LUT herein may be a programmable hardware data component, or may be a pre-programmed fixed data component (which is usually easy to save costs).

In this embodiment, the data processing signal is converted into an alignment signal of the target display standard.

The data processing signal is converted into the alignment signal in the target display standard to realize the alignment of the display standard of the secondary picture signal G0 with the display standard of the main picture signal S0.

Specifically, in this embodiment, the step of converting the data processing signal into the alignment signal in the target display standard includes: converting the data processing signal from a source color gamut to the target color gamut, and converting the data processing signal from the source luminance domain to the target luminance domain, to obtain an alignment signal in the target color gamut and target luminance domain.

The data processing signal is converted from the source color gamut to the target color gamut, and the data processing signal is converted from the source luminance domain to the target luminance domain, thereby achieving the alignment of the secondary picture signal G0 with the main picture signal S0 in the color gamut and the luminance domain, and finally achieving the alignment of the display standard of the secondary picture signal G0 with that of the main picture signal S0.

In this embodiment, the data processing signal is converted from the source color gamut to the target color gamut through a color gamut matrix.

A color space of the source color gamut can be mapped to a color space of the target color gamut through the color gamut matrix with high conversion accuracy, which helps ensure consistency and accuracy of colors.

Specifically, a 3×3 matrix multiplication table is adopted as the color gamut matrix.

In an example, referring to FIG. 3, the data processing signal is converted from the source color gamut to the target color gamut through a color gamut matrix component.

In another embodiment, the data processing signal may be further converted from the source color gamut to the target color gamut through a three-dimensional mapping table.

In this embodiment, the data processing signal is converted from the source luminance domain to the target luminance domain through a luminance LUT.

Specifically, a linear RGB signal of a pixel is inputted into a luminance LUT, and a corresponding address is obtained from the luminance LUT. The address displays a new RGB signal in the luminance LUT, and the original RGB signal is replaced with the new RGB signal to obtain the linear signal.

In an example, referring to FIG. 3, the data processing signal is converted from the source luminance domain to the target luminance domain through the luminance LUT by using an optical-optical transfer function (OOTF).

In another embodiment, alternatively, the OOTF table stores a gain value, and the gain value obtained from the OOTF table is found based on a value of max (R, G, B) and used as a gain value of RGB of a current pixel, thereby realizing conversion of luminance from the source domain to the target domain.

It should be noted that in this embodiment, a sequence of converting the data processing signal from the source color gamut to the target color gamut and converting the data processing signal from the source luminance domain to the target luminance domain is not limited. After the two processes are completed, an alignment signal in the target color gamut and the target luminance domain is obtained.

In this embodiment, the alignment signal is converted into a display signal.

The alignment signal is converted into the display signal, enabling the secondary picture signal G0 and the main picture signal S0 to be displayed on a device subsequently after the fusion.

In this embodiment, the converting the alignment signal into a display signal includes:

realizing conversion of the alignment signal from a linear domain to a nonlinear domain to obtain a nonlinear signal of the alignment signal mapped to the nonlinear domain as the display signal.

The conversion of the alignment signal from the linear domain (Linear/Optical Domain) to the nonlinear domain (Electrical Domain) is realized, enabling the obtained display signal to be desirably displayed on the device.

In an example, referring to FIG. 3, the alignment signal is converted into the display signal through an optical-electro transfer function (OETF).

In this embodiment, the conversion of the alignment signal from the linear domain to the nonlinear domain is realized through a nonlinear LUT.

Specifically, a linear RGB signal of a pixel is inputted into a nonlinear LUT, and a corresponding address is obtained from the nonlinear LUT. The address displays a new RGB signal in the nonlinear LUT, and the original RGB signal is replaced with the new RGB signal to obtain a display signal.

It should be noted that in this embodiment, based on cost considerations in practical implementation, a table size of the LUT is usually less than (2^n), where n is a number of bits of RGB components of pixels, having a median value determined through a linear or Cubic interpolation of adjacent LUT nodes. The LUT herein may be a programmable hardware data component, or may be a pre-programmed fixed data component (which is usually easy to save costs).

In this embodiment, before the subsequent fusion of the display signal with the main picture signal S0, the method includes: performing color space conversion to map the display signal to the target color space.

The color space conversion is performed to map the display signal to the target color space, enabling the display signal and the main picture signal S0 to be fused in the same color space.

Specifically, in this embodiment, the conversion from the RGB color space to the YUV color space is performed, to convert the RGB signal of the display signal into a YUV signal.

In an example, referring to FIG. 3, the color space conversion is performed through a color space conversion matrix (CSC Matrix). Specifically, in an example, [Y U V]'=[c00 c01 c02; c10 c11 c12; c20 c21 c22]*[RGB]'+[d0 d1 d2]'.

It should be noted that in another embodiment, the color space conversion may not be performed, and the display signal and the main picture signal are directly fused subsequently.

Step S4 of fusing the main picture signal S0 and the secondary picture signal G0 to obtain a target picture signal S1 after performing the display standard conversion on the secondary picture signal G0.

The fusion means that the main picture signal S0 and the secondary picture signal G0 are superimposed to obtain the target picture signal S1.

After the display standard conversion is performed on the secondary picture signal G0, the main picture signal S0 and the secondary picture signal G0 can be fused based on the same display standard to obtain the target picture signal S1 with better PQ.

In this embodiment, a menu picture of the secondary picture signal G0 and a target frame of the main video of the main picture signal S0 are fused.

In an example, referring to FIG. 3, the main picture signal S0 and the secondary picture signal G0 are fused in Blender to obtain the target picture signal S1.

In this embodiment, after the display standard conversion is performed on the secondary picture signal G0, in the step of fusing the main picture signal S0 and the secondary picture signal G0 to obtain the target picture signal S1, the display signal and the main picture signal S0 are fused to obtain the target picture signal S1.

Specifically, in this embodiment, in the step of fusing the display signal and the main picture signal S0, the display signal after the color space conversion is fused with the main picture signal S0.

The display signal after the color space conversion is fused with the main picture signal S0 to achieve the fusion of the secondary picture signal G0 and the main picture signal S0 in the same color space.

In this embodiment, before the fusing the main picture signal S0 and the secondary picture signal G0 to obtain a target picture signal S1 after performing the display standard conversion on the secondary picture signal G0, the method further includes: obtaining a fusion coefficient, where the fusion coefficient characterizes a relative weight of the main picture signal S0 and the secondary picture signal G0 during fusion.

The fusion coefficient can characterize a degree of contribution of each of the main picture signal S0 and the secondary picture signal G0 during the fusion for the target picture signal S1 that needs to be obtained, thereby performing the corresponding fusion of the main picture signal S0 and the secondary picture signal G0 based on the fusion coefficient.

Specifically, in this embodiment, referring to FIG. 3, a fusion coefficient alpha is set based on the secondary path.

In another embodiment, alpha may further be generated from another independent hardware engine, or alpha may be read from a double data rate (DDR) memory.

In this embodiment, the step of fusing the main picture signal S0 and the secondary picture signal G0 to obtain a target picture signal S1 after performing the display standard conversion on the secondary picture signal G0 includes: obtaining, based on the fusion coefficient, a weight value of each of the main picture signal S0 and the secondary picture signal G0.

The weight value of each of the main picture signal S0 and the secondary picture signal G0 is obtained to prepare for the fusion of the main picture signal S0 and the secondary picture signal G0.

In this embodiment, weighted average processing is performed on the main picture signal S0 and the secondary picture signal G0 based on the weight values, to obtain the target picture signal S1.

Specifically, in an example, in this embodiment, for each pixel point in a corresponding position, $S1(x, y, c)=S0(x, y, c)+alpha*(G0(x, y, c)-S0(x, y, c))/Norm$, where x and y are coordinate values of the pixel point, c is a component value, for example, in an RGB signal, c of R is equal to 0, c of G is equal to 1, and c of B is equal to 2, and Norm is a normalized value of alpha. For example, if a value of alpha is 8 bits ranging from 0-255, then Norm is equal to 256. In hardware implementation, a shift operation is usually used for fast implementation.

In this embodiment, after the fusing the main picture signal S0 and the secondary picture signal G0 to obtain a target picture signal S1 after performing the display standard conversion on the secondary picture signal G0, the method further includes: configuring the meta data of the main picture signal S0 into a target graphic signal S1.

The meta data of the main picture signal S0 is configured into the target graphic signal S1, so that a configuration of frame-level dynamic meta data is still maintained after fusion.

Figure 4:
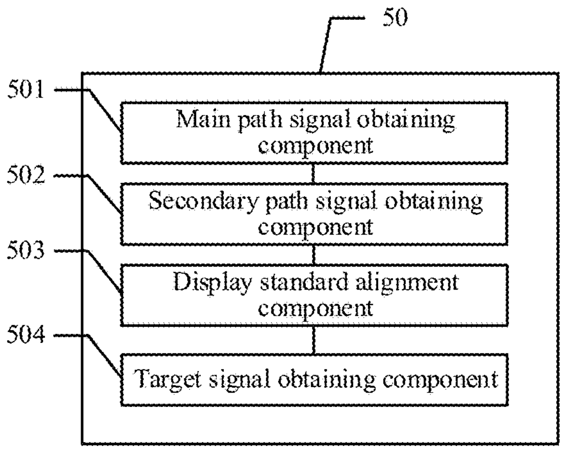
FIG. 4 is a functional block diagram of an embodiment of a detection system for a video picture feature point.

Correspondingly, embodiments of the present invention further provide a system for fusing a plurality of signals. FIG. 4 is a functional block diagram of an embodiment of a system for fusing a plurality of signals.

In this embodiment, the system 50 for fusing a plurality of signals includes: a main path signal obtaining component 501, configured to obtain a picture signal of a target frame in a video of a main path as a main picture signal; a secondary path signal obtaining component 502, configured to obtain a picture signal of a secondary path as a secondary picture signal; a display standard alignment component 503, configured to perform display standard conversion on the secondary picture signal, and align a display standard of the secondary picture signal with a display standard of the main picture signal; and a target signal obtaining component 504, configured to fuse the main picture signal and the secondary picture signal to obtain a target picture signal after performing the display standard conversion on the secondary picture signal.

The main path signal obtaining component 501 is configured to obtain a picture signal of a target frame in a video of a main path as a main picture signal.

The main path is a main video path, and a target frame in a main video is a picture that needs to be fused in the main video. A picture signal of the target frame in the video of the main path is obtained as the main picture signal, which is used as a reference for subsequent fusion.

Specifically, in this embodiment, the main path is a high efficiency video coding decoder (HEVC decoder), and the main picture signal is obtained from the HEVC decoder. In another embodiment, the main picture signal may further be obtained from a decoder in another format (for example, AVS or AV1).

A display standard of the main video is usually relatively high. In an example, in this embodiment, the display standard of the main picture signal of the video of the main path is high dynamic range plus (HDR10+).

In this embodiment, in the obtaining the picture signal of the target frame in the video of the main path as the main picture signal, a color space corresponding to the main picture signal is obtained as a target color space.

The target color space is a color space to which mapping is required for subsequent fusion of the plurality of signals.

Specifically, in this embodiment, the obtained target color space that is the color space corresponding to the main picture signal is a YUV color space, and the obtained main picture signal that is the picture signal of the target frame in the video of the main path is a YUV signal. The YUV signal means that the main picture signal is a signal mapped to the YUV color space, where the YUV signal is a combination of a luminance signal (Y) and two color difference signals (a U component and a V component).

The secondary path signal obtaining component 502 is configured to obtain a picture signal of a secondary path as a secondary picture signal.

The secondary picture signal of the secondary path is configured for achieving subsequent signal fusion with the main picture signal.

A display standard of a picture of the secondary path is usually relatively low. In an example, in this embodiment, a display standard of the secondary picture signal of the secondary path is standard dynamic range (SDR).

In an example, in this embodiment, the secondary picture signal is an RGB signal. The RGB signal refers to a signal of the secondary picture signal in an RGB color space, where RGB represents colors of red, green, and blue paths.

Correspondingly, in this embodiment, in the obtaining the picture signal of the secondary path as the secondary picture signal, the display standard of the secondary picture signal is lower than the display standard of the main picture signal.

In this embodiment, in the obtaining the picture signal of the secondary path as the secondary picture signal, the secondary path is a graphic path (graphic layer).

In an example, in this embodiment, the secondary path is a GPU, and the secondary picture signal is obtained from an on-screen display layer (OSD layer) of the GPU.

In this embodiment, when the secondary path is a video path, the obtaining a picture signal of a secondary path as a secondary picture signal includes: obtaining a graphic signal of a secondary path as a secondary picture signal.

In an example, in this embodiment, the obtained secondary picture signal that is the graphic signal of the secondary path is a menu graphic.

In another embodiment, in the obtaining the picture signal of the secondary path as the secondary picture signal, the secondary path is a video path.

A video of the secondary path is a secondary video.

In another embodiment, when the secondary path is a video path, the obtaining a picture signal of a secondary path as a secondary picture signal includes: obtaining a picture signal of a corresponding frame in the video of the secondary path as a secondary picture signal.

In this embodiment, before the performing display standard conversion on the secondary picture signal, and aligning a display standard of the secondary picture signal with a display standard of the main picture signal subsequently, the method further includes: obtaining meta data of the main picture signal.

Meta data is data about data, which is mainly defined as information about data properties. The obtained meta data of the main picture signal is configured for subsequently obtaining, based on the meta data of the main picture signal, a reference for aligning the display standard of the secondary picture signal with the display standard of the main picture signal.

Specifically, in this embodiment, the main video of the main path is an HDR10+ video with corresponding frame-level meta data. In other words, the main picture signal has frame-based dynamic meta data.

The display standard alignment component 503 is configured to perform display standard conversion on the secondary picture signal, and align a display standard of the secondary picture signal with a display standard of the main picture signal.

The alignment means that the display standard of the secondary picture signal is converted to be the same as the display standard of the main picture signal.

The display standard conversion is performed on the secondary picture signal, and the display standard of the secondary picture signal is aligned with the display standard of the main picture signal, so that the secondary picture signal and the main picture signal can perform data fusion in the same space subsequently.

In this embodiment, the display standard of the secondary picture signal is aligned with the display standard of the main picture signal, that is, the secondary picture signal of the secondary path is aligned with the main picture signal of the main path by using the display standard of the main picture signal of the main path as a reference. Moreover, the display standard of the main path, especially a video, is usually higher than the display standard of the secondary path, and then the main picture signal and the secondary picture signal are fused to obtain the target picture signal, which helps ensure PQ of a region of a secondary picture signal in the target picture signal, and reduce a probability of inter-frame flicker in a region of the secondary picture signal, and further helps maintain the PQ of the main path video and well maintain the PQ of the target picture signal after fusion, thereby implementing signal fusion with PQ assurance.

In an example, in this embodiment, Fun (D0) is adopted to perform the display standard conversion on the secondary picture signal in this embodiment.

In this embodiment, the performing display standard conversion on the secondary picture signal, and aligning a display standard of the secondary picture signal with a display standard of the main picture signal includes: parsing the meta data of the main picture signal to obtain the display standard of the main picture signal, and using the display standard of the main picture signal as a target display standard.

The meta data of the main picture signal is parsed to obtain the display standard of the main picture signal as the target display standard, which is used as a reference to perform display standard conversion on the secondary picture signal.

In an example, in this embodiment, the meta data of the main picture signal is parsed through a meta parser, to obtain the display standard of the main picture signal as the target display standard.

In this embodiment, the parsing the meta data of the main picture signal to obtain the display standard of the main picture signal as the target display standard includes: obtaining a color gamut of the main picture signal as a target color gamut; and obtaining a luminance domain of the main picture signal as a target luminance domain.

The color gamut of the main picture signal is obtained as the target color gamut, so that the secondary picture signal subsequently obtains, based on this, a signal matching the target color gamut after the conversion. The luminance domain of the main picture signal is obtained as the target luminance domain, so that the secondary picture signal subsequently obtains, based on this, a signal matching the target luminance domain after the conversion.

Correspondingly, in this embodiment, the display standard conversion is performed on the secondary picture signal based on the target display standard.

In this embodiment, the performing the display standard conversion on the secondary picture signal based on the target display standard includes: converting the secondary picture signal into a data processing signal.

The secondary picture signal is converted into a data processing signal, so that the secondary picture signal is converted into a signal suitable for measurement, and the subsequent conversion of the display standard of the data processing signal is more accurate.

In this embodiment, the converting the secondary picture signal into the data processing signal includes: realizing conversion of the secondary picture signal from a nonlinear domain to a linear domain, to obtain a linear signal of the secondary picture signal mapped to the linear domain as the data processing signal.

The conversion of the secondary picture signal from the nonlinear domain (Electrical Domain) to the linear domain (Linear/Optical Domain) is realized to obtain a linear signal that is easier to measure, which helps improve the accuracy of subsequent display standard conversion of the linear signal.

In an example, in this embodiment, the secondary picture signal is converted into a linear signal through an EOTF.

In this embodiment, the conversion of the secondary picture signal from the nonlinear domain to the linear domain is realized through a linear LUT.

Specifically, an RGB signal of a pixel is inputted into a linear LUT, and a corresponding address is obtained from the linear LUT. The address displays a new RGB signal in the linear LUT, and the original RGB signal is replaced with the new RGB signal to obtain the linear signal.

It should be noted that in this embodiment, based on cost considerations in practical implementation, a table size of the LUT is usually less than (2^n), where n is a number of bits of RGB components of pixels, having a median value determined through a linear or Cubic interpolation of adjacent LUT nodes. The LUT herein may be a programmable hardware data component, or may be a pre-programmed fixed data component (which is usually easy to save costs).

In this embodiment, the data processing signal is converted into an alignment signal of the target display standard.

The data processing signal is converted into the alignment signal in the target display standard to realize the alignment of the display standard of the secondary picture signal with the display standard of the main picture signal.

Specifically, in this embodiment, the converting the data processing signal into the alignment signal in the target display standard includes: converting the data processing signal from a source color gamut to the target color gamut, and converting the data processing signal from the source luminance domain to the target luminance domain, to obtain an alignment signal in the target color gamut and target luminance domain.

The data processing signal is converted from the source color gamut to the target color gamut, and the data processing signal is converted from the source luminance domain to the target luminance domain, thereby achieving the alignment of the secondary picture signal with the main picture signal in the color gamut and the luminance domain, and finally achieving the alignment of the display standard of the secondary picture signal with that of the main picture signal.

In this embodiment, the data processing signal is converted from the source color gamut to the target color gamut through a color gamut matrix.

A color space of the source color gamut can be mapped to a color space of the target color gamut through the color gamut matrix with high conversion accuracy, which helps ensure consistency and accuracy of colors.

Specifically, a 3×3 matrix multiplication table is adopted as the color gamut matrix.

In an example, in this embodiment, the data processing signal is converted from the source color gamut to the target color gamut through a color gamut matrix component.

In another embodiment, the data processing signal may be further converted from the source color gamut to the target color gamut through a three-dimensional mapping table.

In this embodiment, the data processing signal is converted from the source luminance domain to the target luminance domain through a luminance LUT.

Specifically, a linear RGB signal of a pixel is inputted into a luminance LUT, and a corresponding address is obtained from the luminance LUT. The address displays a new RGB signal in the luminance LUT, and the original RGB signal is replaced with the new RGB signal to obtain the linear signal.

In an example, in this embodiment, the data processing signal is converted from the source luminance domain to the target luminance domain through the luminance LUT by using an OOTF.

In another embodiment, alternatively, the OOTF table stores a gain value, and the gain value obtained from the OOTF table is found based on a value of max (R, G, B) and used as a gain value of RGB of a current pixel, thereby realizing conversion of luminance from the source domain to the target domain.

It should be noted that in this embodiment, a sequence of converting the data processing signal from the source color gamut to the target color gamut and converting the data processing signal from the source luminance domain to the target luminance domain is not limited. After the two processes are completed, an alignment signal in the target color gamut and the target luminance domain is obtained.

In this embodiment, the alignment signal is converted into a display signal.

The alignment signal is converted into the display signal, enabling the secondary picture signal and the main picture signal to be displayed on a device subsequently after the fusion.

In this embodiment, the converting the alignment signal into a display signal includes: realizing conversion of the alignment signal from a linear domain to a nonlinear domain to obtain a nonlinear signal of the alignment signal mapped to the nonlinear domain as the display signal.

The conversion of the alignment signal from the linear domain (Linear/Optical Domain) to the nonlinear domain (Electrical Domain) is realized, enabling the obtained display signal to be desirably displayed on the device.

In an example, referring to FIG. 3, the alignment signal is converted into the display signal through an OETF.

In this embodiment, the conversion of the alignment signal from the linear domain to the nonlinear domain is realized through a nonlinear LUT.

Specifically, a linear RGB signal of a pixel is inputted into a nonlinear LUT, and a corresponding address is obtained from the nonlinear LUT. The address displays a new RGB signal in the nonlinear LUT, and the original RGB signal is replaced with the new RGB signal to obtain a display signal.

It should be noted that in this embodiment, based on cost considerations in practical implementation, a table size of the LUT is usually less than (2^n), where n is a number of bits of RGB components of pixels, having a median value determined through a linear or Cubic interpolation of adjacent LUT nodes. The LUT herein may be a programmable hardware data component, or may be a pre-programmed fixed data component (which is usually easy to save costs).

In this embodiment, before the subsequent fusion of the display signal with the main picture signal, the method includes: performing color space conversion to map the display signal to the target color space.

The color space conversion is performed to map the display signal to the target color space, enabling the display signal and the main picture signal to be fused in the same color space.

Specifically, in this embodiment, the conversion from the RGB color space to the YUV color space is performed, to convert the RGB signal of the display signal into a YUV signal.

In an example, in this embodiment, the color space conversion is performed through a CSC matrix. Specifically, in an example, [YUV]'=[c00 c01 c02; c10 c11 c12; c20 c21 c22]*[RG B]'+[d0 d1 d2]'.

It should be noted that in another embodiment, the color space conversion may not be performed, and the display signal and the main picture signal are directly fused subsequently.

The target signal obtaining component 504 is configured to fuse the main picture signal and the secondary picture signal to obtain a target picture signal after performing the display standard conversion on the secondary picture signal.

The fusion means that the main picture signal and the secondary picture signal are superimposed to obtain the target picture signal.

After the display standard conversion is performed on the secondary picture signal, the main picture signal and the secondary picture signal can be fused based on the same display standard to obtain the target picture signal with better PQ.

In this embodiment, a menu picture of the secondary picture signal and a target frame of the main video of the main picture signal are fused.

In an example, in this embodiment, the main picture signal and the secondary picture signal are fused in Blender to obtain the target picture signal.

In this embodiment, after the display standard conversion is performed on the secondary picture signal, in the fusing the main picture signal and the secondary picture signal to obtain the target picture signal, the display signal and the main picture signal are fused to obtain the target picture signal.

Specifically, in this embodiment, in the fusing the display signal and the main picture signal, the display signal after the color space conversion is fused with the main picture signal.

The display signal after the color space conversion is fused with the main picture signal to achieve the fusion of the secondary picture signal and the main picture signal in the same color space.

In this embodiment, before the fusing the main picture signal and the secondary picture signal to obtain a target picture signal after performing the display standard conversion on the secondary picture signal, the method further includes: obtaining a fusion coefficient, where the fusion coefficient characterizes a relative weight of the main picture signal and the secondary picture signal during fusion.

The fusion coefficient can characterize a degree of contribution of each of the main picture signal and the secondary picture signal during the fusion for the target picture signal that needs to be obtained, thereby performing the corresponding fusion of the main picture signal and the secondary picture signal based on the fusion coefficient.

Specifically, in this embodiment, a fusion coefficient alpha is set based on the secondary path.

In another embodiment, alpha may further be generated from another independent hardware engine, or alpha may be read from a DDR memory.

In this embodiment, the fusing the main picture signal and the secondary picture signal to obtain a target picture signal after performing the display standard conversion on the secondary picture signal includes: obtaining, based on the fusion coefficient, a weight value of each of the main picture signal and the secondary picture signal.

The weight value of each of the main picture signal and the secondary picture signal is obtained to prepare for the fusion of the main picture signal and the secondary picture signal.

In this embodiment, weighted average processing is performed on the main picture signal and the secondary picture signal based on the weight values, to obtain the target picture signal.

Specifically, in an example, in this embodiment, for each pixel point in a corresponding position, S1(x, y, c)=S0(x, y, c)+alpha*(G0(x, y, c)−S0(x, y, c))/Norm, where x and y are coordinate values of the pixel point, c is a component value, for example, in an RGB signal, c of R is equal to 0, c of G is equal to 1, and c of B is equal to 2, and Norm is a normalized value of alpha. For example, if a value of alpha is 8 bits ranging from 0-255, then Norm is equal to 256. In hardware implementation, a shift operation is usually used for fast implementation.

In this embodiment, after the fusing the main picture signal and the secondary picture signal to obtain a target picture signal after performing the display standard conversion on the secondary picture signal, the method further includes: configuring the meta data of the main picture signal into a target graphic signal.

The meta data of the main picture signal is configured into the target graphic signal, so that a configuration of frame-level dynamic meta data is still maintained after fusion.

Figure 5:
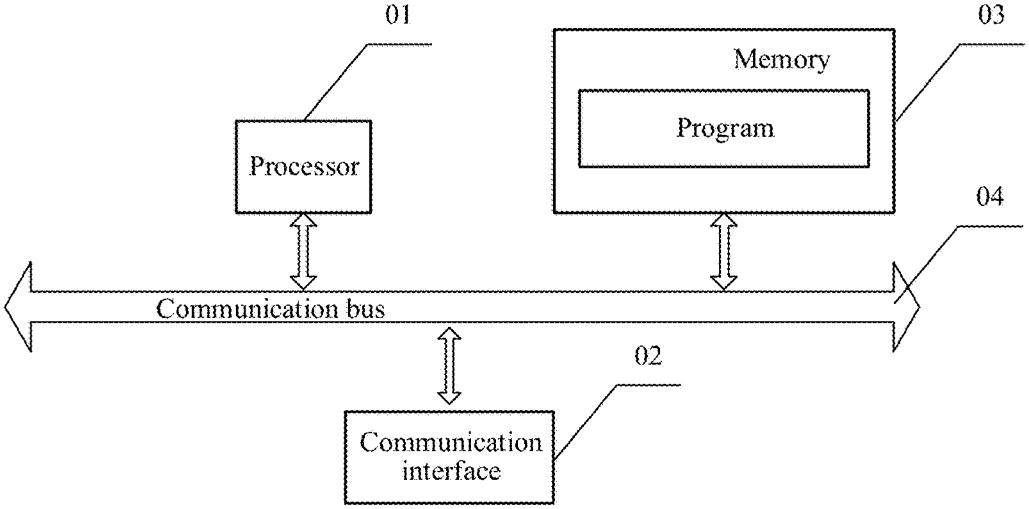
FIG. 5 is a hardware structure diagram of an embodiment of a device.

An embodiment of the present invention further provides a device. The device may implement the method for fusing a plurality of signals provided in the embodiments of the present invention through the method for fusing a plurality of signals in the form of loading a program. An optional hardware structure of a terminal device provided in the embodiments of the present invention may be shown in FIG. 5, including at least one processor 01, at least one communication interface 02, at least one memory 03, and at least one communication bus 04.

In this embodiment, at least one processor 01, at least one communication interface 02, at least one memory 03, and at least one communication bus 04 are provided. The processor 01, the communication interface 02, and the memory 03 communicate with each other by using the communication bus 04. The communication interface 02 may be an interface of a communication component for performing network communication, for example, an interface of a GSM component. The processor 01 may be a central processing unit (CPU), or an application specific integrated circuit (ASIC), or one or more integrated circuits configured to implement the embodiments of the present invention. The memory 03 may include a high-speed RAM memory, and may further include a non-volatile memory (NVM), such as at least one disk memory. The memory 03 stores one or more computer instructions. The one or more computer instructions are executed by the processor 01 to implement the method for fusing a plurality of signals provided in the embodiments of the present invention.

It should be noted that the foregoing terminal device for implementation may further include other devices (not shown) that may not be necessary for the content disclosed in the embodiments of the present invention. Since the other devices may not be necessary for understanding the content disclosed in the embodiments of the present invention, the devices are not to be described one by one in the embodiments of the present invention.

An embodiment of the present invention further provides a storage medium, the storage medium storing one or more computer instructions, the one or more computer instructions being configured for implementing the method for fusing a plurality of signals provided in the embodiments of the present invention.

In the embodiments of the present invention, the display standard of the secondary picture signal is aligned with the display standard of the main picture signal, that is, the secondary picture signal of the secondary path is aligned with the main picture signal of the main path by using the display standard of the main picture signal of the main path as a reference. Moreover, the display standard of the main path, especially a video, is usually higher than the display standard of the secondary path, and then the main picture signal and the secondary picture signal are fused to obtain the target picture signal, which helps ensure PQ of a region of a secondary picture signal in the target picture signal, and reduce a probability of inter-frame flicker in a region of the secondary picture signal, and further helps maintain the PQ of the main path video and well maintain the PQ of the target picture signal after fusion, thereby implementing signal fusion with PQ assurance.

The foregoing implementations of the present invention are a combination of disclosed elements and features. Unless otherwise mentioned, the elements or features may be considered optional. Each element or feature may be practiced without being combined with other elements or features. In addition, the implementations of the present invention may be constructed by combining some elements and/or features. An order of operations described in the implementations of the present invention may be rearranged. Some configurations of any implementation may be included in another implementation and may be replaced with corresponding configurations of another implementation. It is apparent to a person skilled in the art that claims that have no explicit reference relationship with each other in the appended claims may be combined into an implementation of the present invention, or may be included as new claims in amendments after this application is filed.

The implementations of the present invention may be implemented by various means such as hardware, firmware, software, or a combination thereof. In a hardware configuration mode, the method according to an exemplary implementation of the present invention may be implemented through one or more ASICs, a digital signal processor (DSP), a DSP device (DSPD), a programmable logic device (PLD), a field programmable gate array (FPGA), a processor, a controller, a micro-controller, a microprocessor, and the like. In a firmware or software configuration mode, the implementations of the present invention may be implemented in the form of components, processes, functions, and the like. Software code may be stored in a memory component and executed by a processor. The memory component is located inside or outside the processor, and may send data to and receive data from the processor by various known means.

An embodiment of the present invention further provides a computer program product, including a computer program/instruction, the computer program/instruction, when executed by a processor, implementing the method for fusing a plurality of signals provided in the embodiments of the present invention.

The foregoing descriptions of the disclosed embodiments enable a person skilled in the art to implement or use embodiments of the present invention. Various modifications to these embodiments are apparent to a person skilled in the art, and general principles defined in this specification may be implemented in other embodiments without departing from the spirit or scope of the present invention. Therefore, the scope of the present invention is not to be limited to these embodiments described herein, but accords with the widest scope consistent with the principles and novel features disclosed herein.

Although embodiments of the present invention are disclosed above, the scope of the present invention is not limited thereto. A person skilled in the art can make various changes and modifications without departing from the spirit and the scope of the present invention. Therefore, the protection scope of the present invention should be subject to the scope defined by the claims.

What is claimed is:

1. A method for fusing a plurality of signals, comprising:

obtaining a picture signal of a target frame in a video of a main path as a main picture signal;

obtaining a picture signal of a secondary path as a secondary picture signal;

obtaining metadata of the main picture signal, parsing the metadata of the main picture signal to obtain a display standard of the main picture signal, and using the display standard of the main picture signal as a target display standard;

performing display standard conversion on the secondary picture signal based on the target display standard by:

converting the secondary picture signal into a data processing signal;

converting the data processing signal into an alignment signal of the target display standard; and converting the alignment signal into a display signal; and fusing the main picture signal and the display signal to obtain a target picture signal after performing the display standard conversion on the secondary picture signal.

2. The method for fusing a plurality of signals according to claim 1, wherein:

when the secondary path is a video path, the method comprises obtaining a picture signal of a corresponding frame in a video of the secondary path as the secondary picture signal in the step of obtaining the picture signal of the secondary path as the secondary picture signal; or when the secondary path is a graphic path, the method comprises obtaining a graphic signal of the secondary path as the secondary picture signal in the step of obtaining the picture signal of the secondary path as the secondary picture signal.

3. The method for fusing a plurality of signals according to claim 1, wherein the display standard of the secondary picture signal is lower than the display standard of the main picture signal.

4. The method for fusing a plurality of signals according to claim 1, wherein the step of parsing the metadata of the main picture signal to obtain the display standard of the main picture signal as the target display standard comprises obtaining a color gamut of the main picture signal as a target color gamut; obtaining a luminance domain of the main picture signal as a target luminance domain; and wherein the step of converting the data processing signal into the alignment signal of the target display standard comprises converting the data processing signal from a source color gamut to the target color gamut, and converting the data processing signal from a source luminance domain to the target luminance domain, to obtain an alignment signal in the target color gamut and target luminance domain.

5. The method for fusing a plurality of signals according to claim 4, wherein the data processing signal is converted from the source color gamut to the target color gamut through a color gamut matrix or a three-dimensional mapping table.

6. The method for fusing a plurality of signals according to claim 4, wherein the data processing signal is converted from the source luminance domain to the target luminance domain through a luminance look up table (LUT).

7. The method for fusing a plurality of signals according to claim 1, wherein the step of converting the secondary picture signal into the data processing signal comprises realizing conversion of the secondary picture signal from a nonlinear domain to a linear domain, to obtain a linear signal of the secondary picture signal mapped to the linear domain as the data processing signal.

8. The method for fusing a plurality of signals according to claim 7, wherein the conversion of the secondary picture signal from the nonlinear domain to the linear domain is realized through a linear LUT.

9. The method for fusing a plurality of signals according to claim 1, wherein the step of converting the alignment signal into the display signal comprises realizing conversion of the alignment signal from a linear domain to a nonlinear domain to obtain a nonlinear signal of the alignment signal mapped to the nonlinear domain as the display signal.

10. The method for fusing a plurality of signals according to claim 9, wherein the conversion of the alignment signal from the linear domain to the nonlinear domain is realized through a nonlinear LUT.

11. The method for fusing a plurality of signals according to claim 1, wherein in the step of obtaining the picture signal of the target frame in the video of the main path as the main picture signal, a color space corresponding to the main picture signal is obtained as a target color space; and wherein before the fusing the main picture signal and the display signal, the method comprises:

performing color space conversion to map the display signal to the target color space; and fusing the display signal after the color space conversion with the main picture signal in the step of fusing the main picture signal and the display signal.

12. The method for fusing a plurality of signals according to claim 1, wherein after the fusing the main picture signal and the display signal to obtain the target picture signal, the method further comprises configuring the metadata of the main picture signal into a target graphic signal.

13. The method for fusing a plurality of signals according to claim 1, wherein before the fusing the main picture signal and the display signal to obtain the target picture signal, the method further comprises obtaining a fusion coefficient, wherein the fusion coefficient characterizes a relative weight of the main picture signal and the secondary picture signal during fusion; and wherein the step of obtaining the target picture signal comprises:

obtaining, based on the fusion coefficient, a weight value of each of the main picture signal and the secondary picture signal; and performing weighted average processing on the main picture signal and the secondary picture signal based on the weight values, to obtain the target picture signal.

14. A device, comprising:

at least one memory and at least one processor, the at least one memory storing one or more computer instructions that, when executed by the at least one processor, cause the at least one processor to implement a method for fusing a plurality of signals, the method comprising:

obtaining a picture signal of a target frame in a video of a main path as a main picture signal;

obtaining metadata of the main picture signal, parsing the metadata of the main picture signal to obtain a display standard of the main picture signal, and using the display standard of the main picture signal as a target display standard;

obtaining a picture signal of a secondary path as a secondary picture signal;

performing display standard conversion on the secondary picture signal based on the target display standard by:

converting the secondary picture signal into a data processing signal;

converting the data processing signal into an alignment signal of the target display standard; and converting the alignment signal into a display signal; and fusing the main picture signal and the display signal to obtain a target picture signal after performing the display standard conversion on the secondary picture signal.

15. The device according to claim 14, wherein:

when the secondary path is a video path, the method comprises obtaining a picture signal of a corresponding frame in a video of the secondary path as the secondary picture signal in the step of obtaining the picture signal of the secondary path as the secondary picture signal; or when the secondary path is a graphic path, the method comprises obtaining a graphic signal of the secondary path as the secondary picture signal in the step of obtaining the picture signal of the secondary path as the secondary picture signal.

16. The device according to claim 14, wherein the display standard of the secondary picture signal is lower than the display standard of the main picture signal.

17. A non-transitory storage medium storing one or more computer instructions that, when executed by at least one processor, cause the at least one processor to implement a method for fusing a plurality of signals, the method comprising:

obtaining a picture signal of a target frame in a video of a main path as a main picture signal;

obtaining metadata of the main picture signal, parsing the metadata of the main picture signal to obtain a display standard of the main picture signal, and using the display standard of the main picture signal as a target display standard;

obtaining a picture signal of a secondary path as a secondary picture signal;

performing display standard conversion on the secondary picture signal based on the target display standard by:

converting the secondary picture signal into a data processing signal;

converting the data processing signal into an alignment signal of the target display standard; and converting the alignment signal into a display signal; and fusing the main picture signal and the display signal to obtain a target picture signal after performing the display standard conversion on the secondary picture signal.

18. The non-transitory storage medium according to claim 17, wherein:

when the secondary path is a video path, the method comprises obtaining a picture signal of a corresponding frame in a video of the secondary path as the secondary picture signal in the step of obtaining the picture signal of the secondary path as the secondary picture signal; or when the secondary path is a graphic path, the method comprises obtaining a graphic signal of the secondary path as the secondary picture signal in the step of obtaining the picture signal of the secondary path as the secondary picture signal.

* * * * *